(No Model.)

G. N. ANTHOINE.
GIN SAW FILING MACHINE.

No. 566,646. Patented Aug. 25, 1896.

Witnesses
A. Shaw
R. A. McAdory

Inventor
G. N. Anthoine
By his Attorney P. Byrne

UNITED STATES PATENT OFFICE.

GEORGE NICHOLAS ANTHOINE, OF BIRMINGHAM, ALABAMA.

GIN-SAW-FILING MACHINE.

SPECIFICATION forming part of Letters Patent No. 566,646, dated August 25, 1896.

Application filed September 9, 1895. Serial No. 562,019. (No model.)

*To all whom it may concern:*

Be it known that I, GEORGE NICHOLAS ANTHOINE, a citizen of the United States, residing at Birmingham, in the county of Jefferson and State of Alabama, have invented certain new and useful Improvements in Gin-Saw-Filing Machines; and I do hereby declare the following to be a full, clear, and exact description of the invention, such as will enable others skilled in the art to which it appertains to make and use the same.

My invention relates to improvements in that class of gin-saw-filing machines in which vertically-reciprocating files sharpen the saws without removal from the mandrel; and the objects of my improvement are, first, to provide a gin-saw-filing machine with vertically-reciprocating rods having chucks attached at their lower ends to hold the files and reciprocate the same on the teeth of the saws; second, to provide facilities for the proper adjustment of the machine above the saws and the adjustment of the file-carrying reciprocating rods to any desired angle or position to bring the files to bear properly on the teeth of the saws; third, to provide a twisting or part-rotary motion to the files when acting on the saw-teeth and to release the files from rubbing by throwing them off the saw when making the return or up stroke. I attain these objects by the mechanism illustrated in the accompanying drawings, in which—

Figure 1:
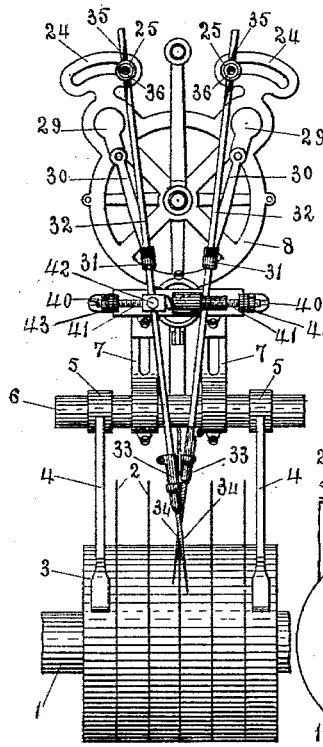
Figure 2:
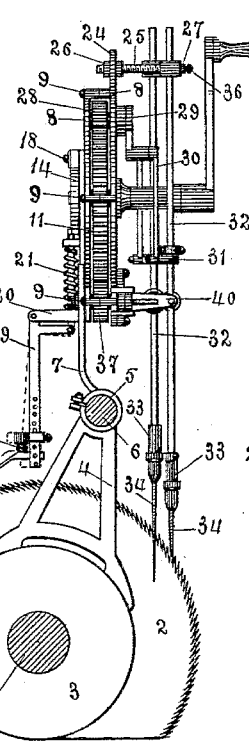
Figure 3:
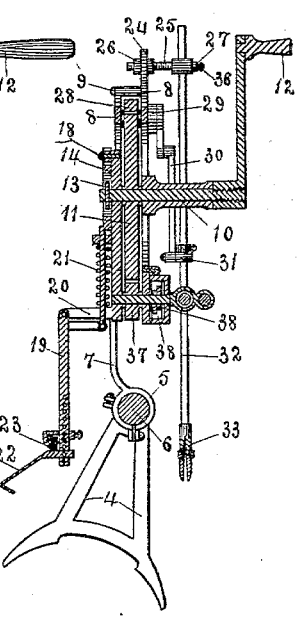
Figure 4:
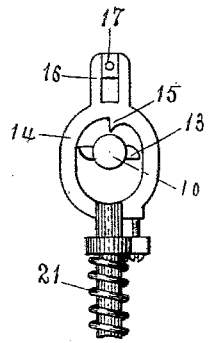
Figure 5:
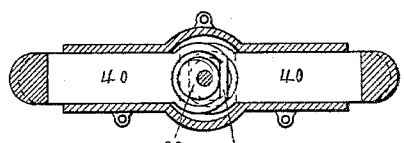
Figure 6:
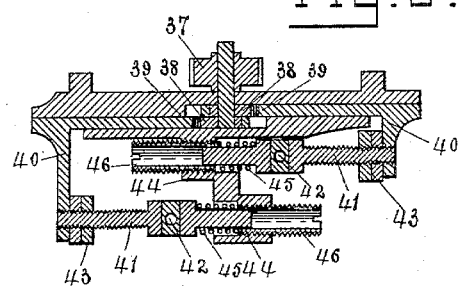

Figure 1 is a vertical front view of the entire machine as shown in position on part of a gin-saw mandrel. Fig. 2 is a vertical side view of the same. Fig. 3 is a vertical cross-sectional view of the machine proper of Fig. 1, through the center. Fig. 4 is an enlarged detail vertical back view of the saw-feeding cam. Fig. 5 is an enlarged detail vertical view of the rod-bearing slides on the faces of the outer eccentric. Fig. 6 is a cross-sectional view of the same through the center.

Similar numerals refer to similar parts throughout the several views.

The part of a gin-saw mandrel 1, as shown, represents the usual form of saw-mandrel, having a series of saws 2 and a series of separating-collars 3 secured thereon in the usual manner.

The gin-saw filer proper is provided with stands 4 4, made of any suitable metallic material. The stands are adapted to be supported on the collars between the saws. The heads of the stands are attached by split collars 5 to a short piece of shafting 6 and can be moved or adjusted to any desired position on the shaft. Two vertical slotted plates 7 7 are also attached to the shaft with split collars and are movable to any desired position. The main frame of the filing-machine is made of two metallic plates 8 8, the plates attached by a series of screws 9. The frame is attached to the slotted plates 7 7 in the usual manner by clamping-bolts. A main shaft 10 is journaled in the center of the frame, the shaft having a main gear-wheel 11 rigidly mounted thereon. The outer end of the shaft is provided with a crank-handle 12 to turn or rotate the same. The back end of the shaft is provided with a double lifter 13 to operate the sliding cam, as hereinafter described.

The sliding cam 14 is formed as shown. A lip 15 is formed on the inside to engage the lifter. A fork is formed on the head to embrace a projection 17 on the frame, a washer and screw 18 holding the cam to place. A stem extends downward from the cam and connects pivotally to a trip-lever 19. The trip-lever is pivoted in projecting arms 20, attached to the frame, a coiled spring 21 being placed on the cam-stem to press on the trip-lever downward. A saw-tooth catch 22 is pivoted in the lower end of the trip-lever, a series of holes being provided to adjust the catch as desired. An adjustable collar carrying a spring 23 is placed on the trip-lever above the catch. The spring pressing downward holds the catch in contact with the saw-teeth.

Two slotted extensions 24 24 are formed on the head of the frame. Adjustable bearing-posts 25 25 are placed in the slots, the posts adjusted and held at any desired position by a series of jam-nuts 26. The heads 27 27 of the bearing-posts are provided with apertures for the file-carrying rods to slide in, as hereinafter described.

Two gear-wheels 28 28, rigidly mounted on shafts, are journaled in the upper part of the frame, the wheels connecting with the main gear. The front ends of the shafts are provided with cranks 29 29, rigidly attached thereto, the cranks having connecting-rods 30 30 pivotally attached and pivotally connecting to slip-clamps 31 31, attached to the reciprocating file-carrying rods 32 32, inserted in the bearings provided therefor. The file-carrying rods are provided at their lower ends with chucks 33 33, the chucks adapted to hold and secure therein the usual form of saw-files 34 34, as shown. The upper end of the file-rods is provided with twisted slots 35 35, having the point of the head-screws 36 36 inserted therein to give a part-rotary motion to the rods as they slide up and down when in motion. A gear-wheel 37, rigidly attached to a shaft, is journaled in the lower part of the frame, the gear connecting with the main gear. Double eccentrics 38 38 are rigidly attached to front end of the gear-shaft. The eccentrics are inclosed in straps 39 39, formed on the lower ends of the sliding jaws 40 40, the sliding jaws carrying adjustable rods 41 41 to adjust the lower bearings 42 42 of the file-carrying rods. The adjusting-rods 41 41 are provided with screw-threads to attach them to like screw-threads formed in the sliding jaws and are held to place by jam-nuts 43 43. The opposite ends of the adjusting-rods have plain spindles sliding in the center bearings 44 44, the spindles, fitted with coiled springs 45 45, having tension-adjusters 46 46 to press the files to the saws on the downstroke. The eccentrics 38 38, operating on the sliding jaws and pushing them inward, throw the files off and prevent them rubbing the saws on the upstroke.

In operation the machine is placed with the stands resting on the collars between the saws. The crank-handle when turned rotates the main gear and saw-feeding device. The main gear rotates the crank-gears, giving a reciprocating and part-rotary motion to the files. The main gear also rotates the eccentric-gear, giving the throw-off motion to the files on the upstroke. The rotation of the handle is continued until one saw is sharpened. The machine is then moved to the next saw and the operation continued until all are sharpened.

Having thus described my invention, what I claim as new, and desire to secure by Letters Patent, is—

1. The combination of the shaft 10 journaled in a frame the shaft having a crank-handle 12 mounted on the outer end thereof, a cam-lifter 13 attached to the back end of the shaft 10 the lifter adapted to lift the yoke 14 pivotally connected to a trip-lever 19, the trip-lever provided at its lower end with a series of holes to pivotally and adjustably attach a saw-tooth catch 22, substantially as and for the purpose described.

2. The combination of the pinion 37 mounted on a shaft journaled in the frame the pinion connecting with the gear-wheel mounted on the main shaft, two reversed eccentrics 38, 38 mounted on the end of the pinion-shaft and operating the sliding jaws 40, 40, the jaws carrying the file-rod bearings and moving the jaws in opposite directions, substantially as described.

3. The combination of the file-rod bearings 42, 42 carried on adjusting-rods 41, 41 the rods provided with springs 45, 45 and adjusting-screws 46, 46, two sliding jaws 40, 40 attached to the adjusting-rods and adjusted thereon by screw-threads and jam-nuts, substantially as and for the purpose described.

In testimony whereof I affix my signature in presence of two witnesses.

GEORGE NICHOLAS ANTHOINE.

Witnesses:
R. A. McADORY,
C. CLAUDY.